United States Patent [19]

Gruno et al.

[11] 4,156,900
[45] May 29, 1979

[54] METHOD AND CIRCUIT ARRANGEMENT FOR SEQUENCING MICROINSTRUCTION SEQUENCES IN DATA PROCESSING EQUIPMENT

[75] Inventors: Gerhard Gruno; Wolfgang Matschke; Wolfgang Lohnstein, all of Berlin, Fed. Rep. of Germany

[73] Assignee: Nixdorf Computer AG, Paderborn, Fed. Rep. of Germany

[21] Appl. No.: 788,406

[22] Filed: Apr. 18, 1977

[30] Foreign Application Priority Data

Apr. 22, 1976 [DE] Fed. Rep. of Germany ....... 2617485

[51] Int. Cl.² .......................... G06F 9/12; G06F 9/18; G06F 9/20
[52] U.S. Cl. .................................................. 364/200
[58] Field of Search ............. 444/1; 364/200 MS File, 364/900 MS File

[56] References Cited

U.S. PATENT DOCUMENTS

| | | | |
|---|---|---|---|
| 3,226,694 | 12/1965 | Wise | 364/200 |
| 3,416,138 | 12/1968 | Brass | 364/200 |
| 3,418,638 | 12/1968 | Anderson et al. | 364/200 |
| 3,636,523 | 1/1972 | De Sandre et al. | 364/200 |
| 3,909,797 | 9/1975 | Goss et al. | 364/200 |
| 3,972,029 | 7/1976 | Bailey, Jr. | 364/200 |
| 3,979,725 | 9/1976 | Disparte et al. | 364/200 |
| 3,980,991 | 9/1976 | Mercurio | 364/200 |
| 4,057,850 | 11/1977 | Kaneda et al. | 364/200 |
| 4,073,006 | 2/1978 | Tubbs | 364/200 |
| 4,079,447 | 3/1978 | Garziera | 364/200 |

OTHER PUBLICATIONS

Koltschak et al., "Regeneration of Subroutine Start Address," IBM Technical Disclosure Bulletin, vol. 14, No. 12, May, 1972.

Primary Examiner—Mark E. Nusbaum
Assistant Examiner—Michael C. Sachs
Attorney, Agent, or Firm—Blanchard, Flynn, Thiel, Boutell & Tanis

[57] ABSTRACT

A circuit for sequencing microinstruction sequences in data processing equipment in which during the course of a primary sequence subroutine jumps are performed and subsequences are carried out and at the end of each, a return jump into the primary sequence takes place due to the control provided by a temporarily stored return jump address at a point in the sequence at which a two-part branching instruction is to be evaluated. The first part of the branching instruction characterizes a branching function which is to be carried out dependent on a decision which is specified in the second part thereof. The circuit includes a microinstruction storage from which microinstruction sequences are taken over depending upon the output signals from a central fixed-cycle control circuit fed into a microinstruction register and a recoder which is arranged thereafter. The central fixed-cycle control circuit feeds into the microinstruction register, through a control signal which characterizes a return jump, a first output signal for maintaining the return jump instruction stored in the microinstruction register and a second output signal for the additional taking over of the branching instruction which is controlled by the return jump address which is transmitted into a microinstruction address register.

3 Claims, 3 Drawing Figures

METHOD AND CIRCUIT ARRANGEMENT FOR SEQUENCING MICROINSTRUCTION SEQUENCES IN DATA PROCESSING EQUIPMENT

FIELD OF THE INVENTION

The invention relates to a method for sequencing microinstruction sequences in data processing equipment in which during the course of a primary sequence subroutine jumps are carried out and subsequences are performed and at the end of each, return jump into the primary sequence takes place by control through a temporarily stored return jump address at a point at which a two-part branching instruction is to be sequenced, the first part of which characterizes a branching function which is to be carried out dependent on a decision which is specified in its second part. Furthermore the invention relates to a circuit arrangement for carrying out the method.

BACKGROUND OF THE INVENTION

In data processing equipment, instruction sequences are sequenced according to a pregiven program within which also so-called subroutine operations can be performed. An analogue principle of carrying out of primary and subsequences is applied also to the sequencing of microinstructions within a microprogram. If from a primary sequence a jump into a subsequence is carried out, then after operation or sequencing of the subsequence a jump into the primary sequence must take place to the place at which same had been left or which follows the jump-off point. For this, during jump-off into the subsequence the address of the immediately following instruction in the primary sequence is temporarily stored and the return jump into the primary sequence occurs through control with the temporarily stored return jump address.

Many microprograms contain at the reentry point into the primary sequence, which reentry point is determined by the return jump address, a two-part instruction which is identified also as a branching instruction. The first part of this instruction characterizes a branching function as an operation to be performed, namely generally a program jump which must be carried out. Program jumps may be subroutine jumps, overjumps in the sense of suppressing an instruction in a linear instruction sequence, direct program jumps and distributing jumps. The decision whether such a program jump and which of the possible program jumps must be carried out is contained in the second instruction part and this decision is made depending on the respective result which was obtained by a performance of the subsequence which is associated with the return jump.

The basic purpose of the invention is to carry out the performance of the branching instructions which are controlled in association with a return jump from a subsequence with as little time and storage input as is possible for the instruction sequence because these instructions as organization instructions do not directly contribute to the actual processing and associating of data.

This purpose is inventively attained for a method of the abovementioned type by using as a first part of the branching instruction the instruction which effects a return jump from the subsequence into the primary sequence after the return jump took place.

The invention has recognized as its basis that the return jump instructions which effect the return jump from a subsequence into a primary sequence must characterize only one operation, namely the jump from the subsequence into the primary sequence, because in them due to the use of the temporarily stored return jump address a special address-forming regulation is not needed. Thus the return jump instructions can be utilized with the jump operation contained in them on the one hand for carrying out the return jump and on the other hand, however, also for carrying out of program jumps which are characterized through the described branching instructions. If now the respective return jump instruction is used at the same time as a first part of a branching instruction, which at any rate is contained at the point of a primary sequence, which is achieved through a return jump, then at this point it is possible to save additional storage input for a special operational part of an instruction word, which operational part characterizes a program jump.

The method according to the invention can be carried out in such a manner that the instruction which effects the respective return jump is temporarily stored at least for the time of the return jump and is combined as an operational part with the information existing at the reentry point of the primary sequence to form an instruction word which illustrates the branching instruction. From this one can see directly that at the reentry point only storage input is needed for the information which characterizes the special type of the branching function which must be carried out. Due to the dual utilization of the return jump instruction, a special storage input for the operational part of the branching instruction is not needed.

Aside from the described savings in storage input for instruction words, the invention achieves the important advantage of a fast sequencing time. This is shown in particular in the case of the here considered microprogramming because microprograms contain as is known a very high number of subsequences, which must be controlled from various points of a primary sequence. If with a correspondingly high number of return jumps which must be carried out, the respective return jump instruction is used as an operational part for the branching instruction which is to be sequenced in the primary sequence at the reentry point, it is directly noticeable that for the sequence time of each return jump instruction and the directly following instruction in the primary sequence only one operational part must be read or evaluated.

A further development of the thought of the invention is the provision of a circuit arrangement for carrying out the method, comprising a microinstruction storage from which the microinstruction sequences are taken over dependent on the output signals of a central fixed-cycle control circuit into a microinstruction register and a recoder which is arranged after said microinstruction register delivers control signals for sequencing the microinstructions, wherein a control signal which characterizes a subroutine jump effects the storing of a return jump address in a return jump address storage and a control signal which characterizes the return jump effects the transfer of the return jump address into a microinstruction address register which is associated with the microinstruction storage, which circuit arrangement is constructed such that the central fixed-cycle control circuit transmits into the microinstruction register through a control signal which characterizes a return jump, an output signal for maintaining the return jump instruction which is stored in the microinstruction register and an output signal for the additional taking over of the branching instruction which is controlled by the return jump address, which is transmitted into the microinstruction address register.

The circuit arrangement corresponds in its principal structure and its basic function to the common comparable circuit arrangements for sequencing microinstruction sequences. The important difference which is caused by the invention consists, however, in that when a return jump instruction occurs in the microinstruction register, the additional control signals which characterize this return jump instruction and are described above are derived, which, on the one hand, directly effect the transfer of the return jump address into the microinstruction address register and on the other hand also effect directly such an influence of the central fixed-cycle control circuit such that same transmits the described output signals into a microinstruction register to effect a storing of the return jump instruction and an additional taking over of the branching instruction which exists at the reentry point of the primary sequence. The circuitry requirements necessary to accomplish this are extremely small and consists only in the recoder which is arranged after the microinstruction register having to be designed for emitting the mentioned control signals and the provision of circuit connections which are necessary for the direct release of the described sequences between the decoder and the central fixed-cycle control circuit or the return jump address storage.

BRIEF DESCRIPTION OF THE DRAWINGS

Exemplary embodiments of the invention and a circuit arrangement which is suited for carrying out the method will be described hereinbelow with reference to the drawings.

In the drawings.

DETAILED DESCRIPTION

Figure 1:
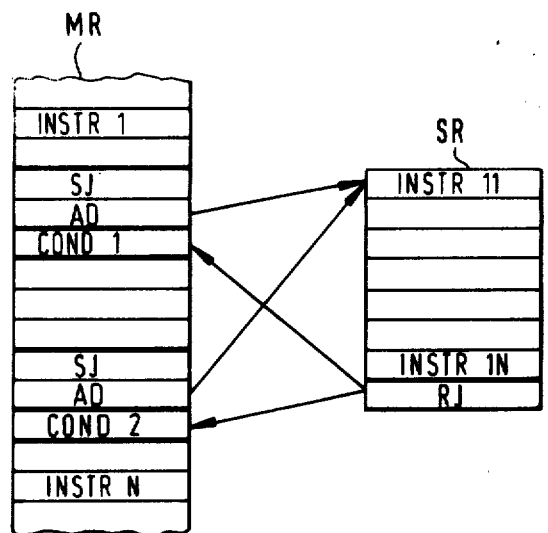
FIG. 1 schematically illustrates a sequence of steps to be followed in a primary set of microinstructions, wherein a subsequence can be repeatedly controlled.

FIG. 1 illustrates a portion of a primary microinstruction sequence MR which consists of successive instructions INSTR 1 to INSTR N. The primary microinstruction sequence has associated therewith a submicroinstruction sequence SR which consists of microinstructions INSTR 11 to INSTR 1N and, in the illustrated exemplary embodiment, can be initiated from two different points in the primary microinstruction sequence MR. In addition, the submicroinstruction sequence SR contains at its end a return jump instruction RJ which effects a return to the primary microinstruction sequence MR at a point therein which immediately follows a point whereat a jump from the microinstruction sequence MR to the submicroinstruction sequence SR occured. The operation of the submicroinstruction subsequence SR takes place upon the occurrence of a jump instruction SJ in the primary microinstruction sequence MR and with which an address code AD is associated and by which the submicroinstruction sequence SR is reached. The jump instruction SJ with the associated address code AD is immediately followed in the primary microinstruction sequence MR by a branching instruction COND 1 which causes in the already discussed manner depending on the results of the data processing steps followed by an operation of the microinstruction sequence SR, either a direct further performance of the primary microinstruction sequence MR or a renewed program jump.

FIG. 1 additionally illustrates a further possibility in the operation of the submicroinstruction subsequence SR initiated from a second point in the primary microinstruction sequence MR in that the second point also has a jump instruction SJ with an associated address code AD and that this instruction is immediately followed by a further branching instruction COND 2 which is different from the branching instruction COND 1.

As already described, in the schematic illustration of the sequence of steps in the microinstructions according to the invention, which illustration is shown in FIG. 1, the information of the return jump instruction RJ is temporarily stored beyond the time interval of the return jump and is combined with the information of the respective branching instruction COND 1 or COND 2 so to speak to form a two-part instruction word so that the special storing of an operational instruction which characterizes a branching function or a program jump at the points of the primary microinstruction sequence MR which contain the respective branching instruction COND 1 or COND 2, is not necessary.

In addition, it will be seen that time is saved for carrying out the described organization of instructions, because the respective return jump instruction RJ is read and evaluated once and no further reading and evaluation of an operational instruction is required because it would belong to the respective branching instruction COND 1 or COND 2.

Figure 2:
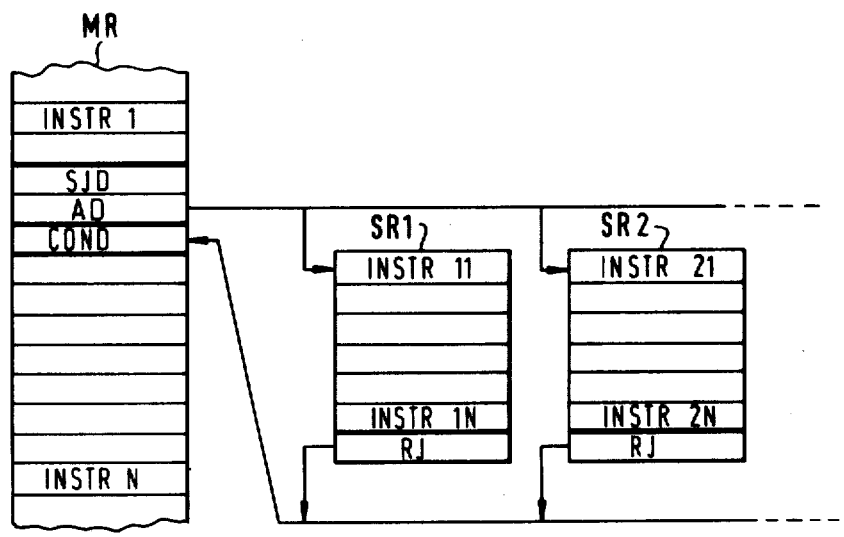
FIG. 2 schematically illustrates a sequence of steps to be followed in a primary set of microinstructions, wherein one of several subsequences can be controlled.

FIG. 2 shows a further schematic illustration to clarify a different possibility of the operation of microinstruction subsequences from a primary microinstruction sequence. The primary microinstruction sequence MR contains like in the illustration according to FIG. 1 instructions INSTR 1 to INSTR N and, as an example, has at one point a distributing jump instruction SJD and an associated address code AD. With this distributing jump instruction, it is possible to achieve one of several possible submicroinstruction sequences SR-1, SR-2, ... SR-N dependent from the information given by the address code AD. Each of these possible submicroinstruction sequences SR-1, SR-2, ... SR-N consists of microinstructions INSTR 11 to INSTR 1N or of microinstructions INSTR 21 to INSTR 2N etc. Each microinstruction subsequence SR-1, SR-2, ... SR-N contains as a last instruction a return jump instruction RJ. As has already been described with reference to FIG. 1, the return jump occurs from the respective submicroinstruction sequences SR-1, SR-2, ... SR-N through the return jump instruction RJ to the reentry point of the primary microinstruction sequence MR at which is presumed to contain a branching instruction COND. According to the invention, the respective return jump instruction RJ is temporarily stored and is combined as a first instruction code with the information of the branching instruction COND so to speak to form one instruction word.

Also in the case of the principle which is illustrated in FIG. 2, it is possible to achieve with the method of the invention a reduction in expense because the storage of instruction information which characterizes a branching function is necessary only once within the scope of the primary microinstruction sequence MR, however, not necessarily in association with each return jump instruction RJ of the submicroinstruction sequences SR-1, SR-2, . . . SR-N. Thus this leads to the return jump instructions RJ of the submicroinstruction sequences SR-1, SR-2, . . . SR-N shown in FIG. 2 being able to be very short because they need contain only the return jump information, thus one operational code. Immediately after reading the return jump instructions RJ, the branching instruction COND which is contained in the primary microinstruction sequence MR can be read and a common evaluation of two instruction codes which are joined together according to the invention to form a new instruction in the primary microinstruction sequence MR can be carried out.

A further reduction of expense which will not be discussed in detail during the sequence of steps in the microinstruction sequences is possible if the principles which are illustrated in FIGS. 1 and 2 are combined with one another and the inventive method is applied to the respective sequence of steps.

Figure 3:
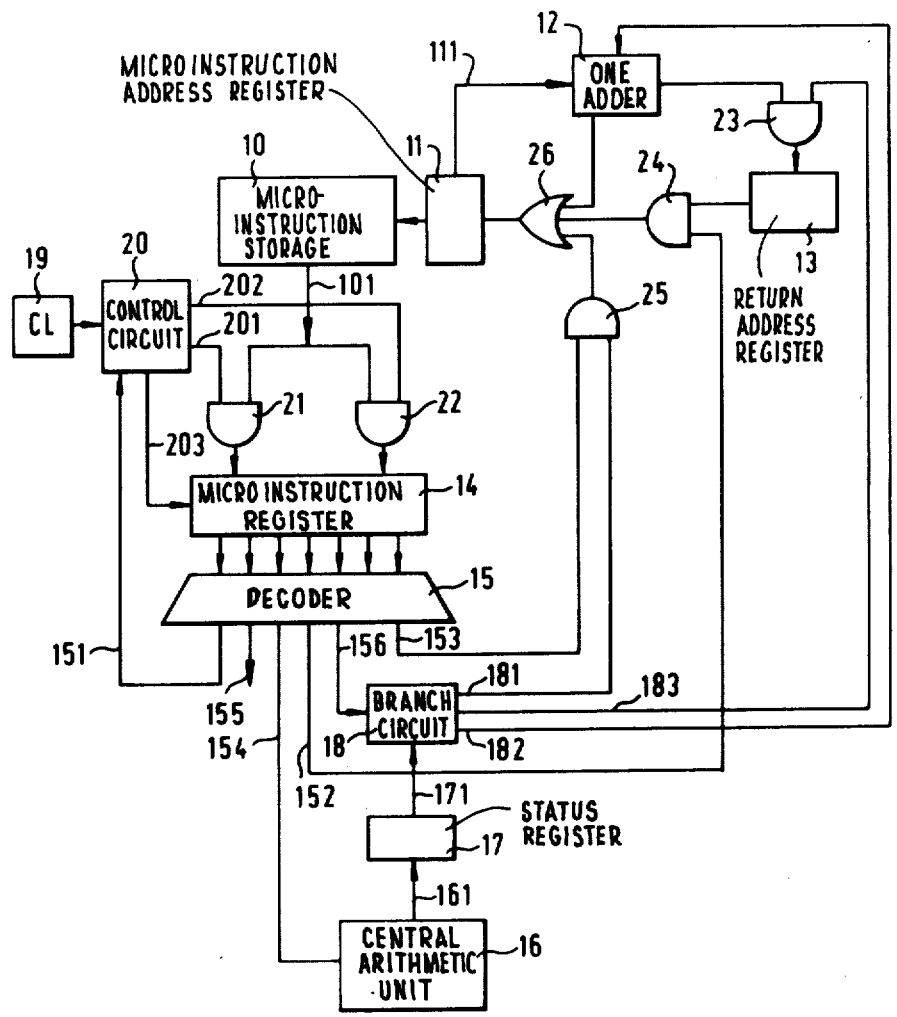
FIG. 3 illustrates the exemplary embodiment of a circuit arrangement for carrying out the inventive method.

FIG. 3 is a block diagram of an exemplary circuit arrangement for carrying out the method according to the invention. The circuit contains the function units of a data processing device which are important for the method and all further function units which are not directly related to the invention are not shown for the purpose of providing a simplified disclosure, especially since their operational characteristics are known to the man skilled in the art.

A microinstruction storage 10 contains the microinstructions which embody the principle of this invention, namely providing a sequence of steps in the form of primary sequences and subsequences. These microinstructions can be achieved in the microinstruction storage 10 by controlling by means of a microinstruction address stored in a microinstruction address register 11. If a linear series of microinstructions is sequenced, namely a microinstruction sequence is performed without carrying out program jumps, then the content of the microinstruction address register 11 is increased by one counting unit each through a ONE-adder circuit 12 so that a correspondingly continuous operation of microinstructions in the microinstruction storage 10 is possible in a linear arrangement. For this, the ONE-adder circuit 12 feeds the respective output signal through an OR-gate 26 to the microinstruction address register 11.

Each microinstruction is fed from the microinstruction storage 10 through its output lines 101 and two AND-gates 21 and 22 selectively into a microinstruction register 14, the output of which is connected to a decoder 15. The evaluation of the respectively stored microinstruction is done by the decoder 15 such that same generates at its output terminals 151 to 156 control signals with which the functions which will be described below are controlled. Additional control signals which are here not illustrated effect the execution of those functions which are necessary for the actual sequencing of the instructions.

A control signal 154 of the decoder 15 controls for example the computing functions which are performed in the central arithmetic unit 16 of the data processing equipment. The arithmetic unit 16 transmits through a line 161 information signals to a status register 17 to characterize the important condition functions of the arithmetic unit. The status register 17 controls through a line 171 in turn a branching logic circuit 18 which in turn transmits output signals 181,182 and 183 dependent on the status signals and under additional control by means of a control signal 156 from the decoder 15. These output signals 181,182 and 183 characterize for example a jump instruction, a counting step which is to be performed within the scope of a linear instruction sequence or a subroutine jump. The circuit connections necessary for this are illustrated in FIG. 3 and extend to an AND-gate 25, to a control input terminal of the ONE-adder 12 and to an AND-gate 23. The output signal from the AND-gate 23 controls a return jump address storage 13. The return jump address storage 13 has the purpose of storing during the performance of a subroutine jump the address with which the reentry point to a primary microinstruction sequence after the performance of a submicroinstruction sequence is achieved. If the criteria which characterizes a subroutine jump or the control signal 183 occurs, then through the AND-gate 23 the return jump address which results from a ONE-addition at the output of the ONE-adder circuit 12 is fed into the return jump address storage 13. The storage of this return jump address and its transfer into the microinstruction address register 11 is dependent on a control signal 152 from the decoder 15 which characterizes a return jump instruction. The control signal 152 is fed to a second input terminal of an AND-gate 24, the first input terminal of which is controlled by the output signals of the return jump address storage 13. Upon occurrence of a return jump instruction or of the control signal 152, the content of the return jump address storage 13 is stored through the OR-gate 26 into the microinstruction address register 11 and is thus available for controlling the microinstruction within the microinstruction storage 10, which in the described manner stands at the reentry point of a primary microinstruction sequence and is a branching instruction.

The operation now takes place at a time at which the return jump instruction of the just run through submicroinstruction sequence is still stored in the microinstruction register 14. This is possible because a control signal 151 of the decoder 15, which characterizes the return jump instruction, influences a central fixed-cycle control 20 which is controlled by a base cycle 19 so that the fixed-cycle control 20 maintains its output signal 201 correspondingly long to cause the storage of the return jump instruction in the microinstruction register 14. The output signal 201 is fed to the second input terminal of the AND-gate 21, to the first input terminal of which is fed the content of the microinstruction storage 10 through its output line 101. A further output signal 202 of the central fixed-cycle control circuit 20 is fed through a correspondingly identified line to the second input terminal of the second AND-gate 22, this output signal effects now the execution of the described branching instruction in addition to the still stored return jump instruction into the microinstruction register 14. How these two output signals 201 and 202 of the central fixed-cycle control 20 must be produced dependent on the control signal 151, need not be described more in detail here because the type of production of the control signals in a suited timely sequence is known to the man skilled in the art and does not belong directly to the thought of the invention. It is only mentioned that the central fixed-cycle control 20 can be connected for example through a special output 203 terminal to a control input terminal of the microinstruction register 14 to effect in this manner a maintaining of the stored return jump instruction so that it is possible to prepare the output 201 for the step of executing a next instruction from the microinstruction storage 10.

It is pointed out supplementarily that FIG. 3 shows only a simplified illustration of the connections between the function units, which connections are the important ones for an understanding of the invention. Multiple connections must of course exist in the case of a parallel transfer of several information bits between individual function units, namely in a number which corresponds to the respectively used instruction word length or the number of storage places in stores or registers, which storage places are to be controlled and read.

Although particular preferred embodiments of the invention have been disclosed in detail for illustrative purposes, it will be recognized that variations or modifications of the disclosed apparatus, including the rearrangements of parts, lie within the scope of the present invention.

The embodiments of the invention in which an exclusive property or privilege is claimed are defined as follows:

1. In a circuit arrangement for executing a first portion microinstruction sequence in data processing equipment wherein during the course of a primary sequence a jump to a subsequence occurs and at the end of the execution of said subsequence, a return jump to the primary sequence occurs for execution of a second portion of said microinstruction sequence, the improvement comprising:

microinstruction storage means containing the primary sequence and the subsequence with the first portion of the primary sequence terminating with a jump instruction and an associated address code immediately followed by a second part of a two-part branching instruction and the subsequence terminating with a return jump code which forms the first part of said two-part branching instruction;

a microinstruction register having two input terminals connected to said microinstruction storage means for respectively receiving said first and second parts of said branching instruction to indicate the instruction to be executed;

central fixed cycle control means for producing first and second sequentially spaced output signals, said central fixed cycle control means being connected to the microinstruction register for effecting a transfer of the microinstruction currently in the microinstruction store to the microinstruction register, said microinstruction storage means and said control means first transferring said first part of said branching instruction to said microinstruction register simultaneous with the occurrence of said first output signal;

a decoder responsive to the appearance in said microinstruction register of said first part of said branching instruction and producing first and second signals;

said central fixed cycle control means being connected to said decoder and being responsive to said first signal to effect a maintaining of said first part of said two-part branching instruction in said microinstruction register; and return address register means responsive to said second signal from said decoder for effecting a transfer of said second part of said branching instruction to said microinstruction register simultaneous with the occurrence of said second output signal from said control means.

2. The improved circuit according to claim 1, wherein said central fixed cycle control means includes a pair of AND-gates each having a pair of input terminals, the output terminal on each thereof being connected to a respective one of said input terminals to said microinstruction register and a control circuit having at least two output terminals each connected to one of said input terminals on a respective one of said AND-gates, said other input terminal to said AND-gates being connected to the other of said microinstruction storage means.

3. In a method for sequencing microinstruction sequences in data processing equipment wherein during the course of a primary sequence a jump to a subroutine occurs and at the end of a subroutine sequence, a return jump to the primary sequence occurs, the improvement comprising the following steps:

sequencing a primary sequence until the occurrence of a jump instruction to a subsequence whereat said primary sequence is temporarily halted;

sequencing said subsequence until the occurrence of a return jump instruction back to said primary sequence whereat said return jump instruction is transferred to a first part of a two-part microinstruction register simultaneous with the occurrence of a first signal from a central fixed cycle control means to form a first part of a two-part branching instruction;

producing first and second signals indicative of the presence of said first part of said two-part branching instruction, in said first part of said microinstruction register, said first signal effecting a maintaining of said first part of said two-part branching instructions in said first part of said microinstruction register, said second signal effecting a transfer of a second part of said two-part branching instruction in said primary sequence from said microinstruction storage means to a second part of said microinstruction register simultaneous with the occurrence of a second signal from said central fixed cycle control means to form a second part of said two-part branching instruction.

* * * * *